United States Patent
Schreiber et al.

(10) Patent No.: US 9,405,922 B2
(45) Date of Patent: Aug. 2, 2016

(54) COMPUTER-IMPLEMENTED METHOD FOR ROLE DISCOVERY AND SIMPLIFICATION IN ACCESS CONTROL SYSTEMS

(75) Inventors: Robert S. Schreiber, Palo Alto, CA (US); William G. Horne, Lawrenceville, NJ (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2267 days.

(21) Appl. No.: 12/348,832

(22) Filed: Jan. 5, 2009

(65) Prior Publication Data
US 2009/0144803 A1    Jun. 4, 2009

Related U.S. Application Data

(63) Continuation-in-part of application No. 11/888,381, filed on Jul. 31, 2007.

(51) Int. Cl.
*G06F 21/00* (2013.01)
*G06F 21/62* (2013.01)

(52) U.S. Cl.
CPC .... *G06F 21/6218* (2013.01); *G06F 2221/2141* (2013.01)

(58) Field of Classification Search
CPC .................................................. G06F 21/31
USPC .......................................... 713/182; 726/2, 3, 6
See application file for complete search history.

(56) References Cited

U.S. PATENT DOCUMENTS

| 7,284,000 | B2 | 10/2007 | Kuehr-McLaren et al. |
| 2004/0243546 | A1 | 12/2004 | Mishra et al. |
| 2005/0138419 | A1* | 6/2005 | Gupta et al. .................. 713/201 |
| 2005/0138420 | A1 | 6/2005 | Sampathkumar et al. |

OTHER PUBLICATIONS

Ene, Alina et al.; "Fast Exact and Heuristic Methods for Role Minimization Problems"; Jun. 2008; 1-10; Association for Computing Machinery; New York, NY, USA.
Mhand Hifi et al; A Neural Network for the Minumum set covering problem, Aug. 23, 2010, 11 Pages.

* cited by examiner

*Primary Examiner* — Christopher Brown
(74) *Attorney, Agent, or Firm* — Fabian VanCott

(57) ABSTRACT

A method includes selecting a first biclique role in a plurality of roles and finding all roles in the plurality that have a set of vertices of a second type that is a subset of a set of vertices of the second type in the first role; removing each of the subsets from the set of vertices of the second type corresponding to the first role; and reassigning the vertices of the first type to the roles such that original associations between the vertices of the first type and the vertices of the second type are maintained.

20 Claims, 18 Drawing Sheets

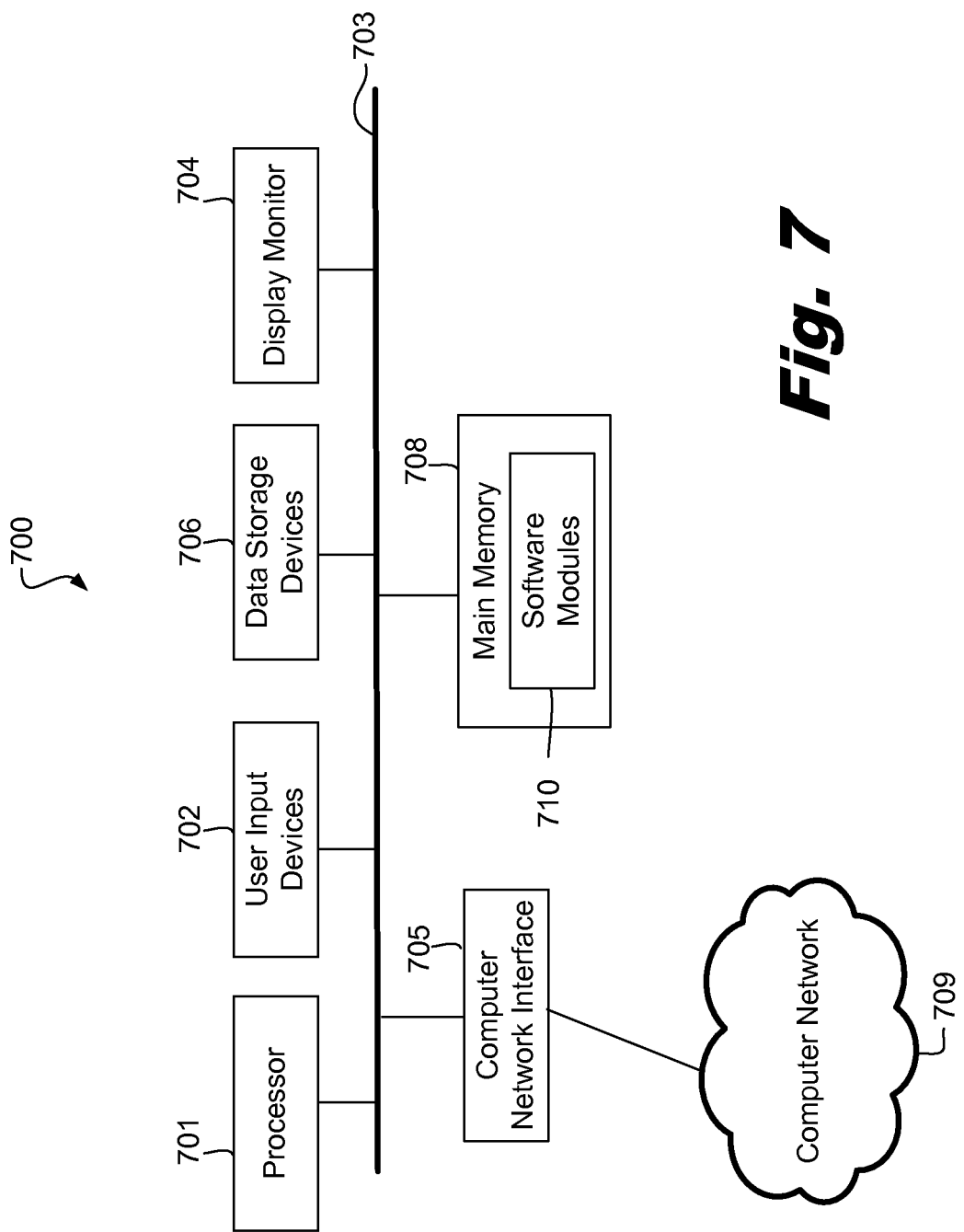

COMPUTER-IMPLEMENTED METHOD FOR ROLE DISCOVERY AND SIMPLIFICATION IN ACCESS CONTROL SYSTEMS

RELATED APPLICATIONS

The present application is a continuation-in-part of U.S. patent application Ser. No. 11/888,381, filed on Jul. 31, 2007 by Robert Schreiber et al.

BACKGROUND

The present application relates generally to access control systems and more particularly to role discovery and simplification in access control systems.

In a simple access control system, access control lists (ACLs) are used. An ACL lists the user accounts (users) that have permission to use a given resource. The resource may be a file, or a network machine (with an internet protocol address), or a service provided by a port on a network machine, for example.

Such a set of ACLs may have a very large number of entries. As a simple example, if one thousand users each had permission to use one thousand different resources, then the ACL set would have a total of one million (one thousand multiplied by one thousand) entries. As the number of users and the number of resources grow, the size of this representation becomes extremely large and unwieldy. It becomes difficult to maintain, to check, to store, to present to an administrator, and to visualize on a graphics display. Ultimately, it becomes difficult, expensive, and error-prone to manage.

One way to reduce the size of the representation of the access permission is to utilize role-based access control (RBAC). In an RBAC system, a new kind of entity, the role, is introduced. Herein, a role may be defined as a set of permissions. Users may have or be assigned roles. A given role confers to its users permission to use certain resources.

In order to migrate from using a set of ACLs to using RBAC, an appropriate set of roles need to be discovered from the ACL data. The present application relates to a computer-implemented method of role discovery in access control systems.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 1A is a diagram showing a bipartite relationship between vertices of a first type representing users A1-A4 and vertices of a second type representing resources B1-B5. FIG. 1B is a diagram with emphasis on user A1 and its permissions. FIG. 1C is a diagram showing the introduction of role C1, and the assignment of role C1 to user A1. FIG. 1D is a diagram with emphasis on user A4 and its permissions. FIG. 1E is a diagram showing the assignment of role C1 to user A4. FIG. 1F is a diagram showing the assignment of roles C2 and C3 to users A2 and A3, respectively.

FIG. 7 is a schematic diagram of an example computer system which may be used to execute the computer-implemented procedures for role discovery and simplification in accordance with an embodiment of the invention.

Throughout the drawings, identical reference numbers designate similar, but not necessarily identical, elements.

DETAILED DESCRIPTION

In some situations, it may be desirable to discover roles from a set of ACLs by representing users and the resources to which the users have been granted access as vertices in a bipartite graph. A greedy algorithm may then be used to map roles to users and resources in the bipartite graph such that each role is connected to a set of users and a set of resources by edges. This type of method may provide significant time-savings and feasibility advantages over a purely recursive algorithm that returns an exact solution to an RBAC conversion. However, in many cases the solution returned by a greedy algorithm may be overly complex.

Therefore, in response to this and other issues, the present specification discloses systems and methods wherein roles are discovered from a set of ACLs through a greedy bipartite graph algorithm and simplified by a heuristic reduction method applied to the discovered roles. These improvements may be advantageously incorporated to facilitate the efficient and effective discovery of roles from a set of ACLs and also in subsequent optimization or re-optimization of an RBAC system.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Figure 1A:
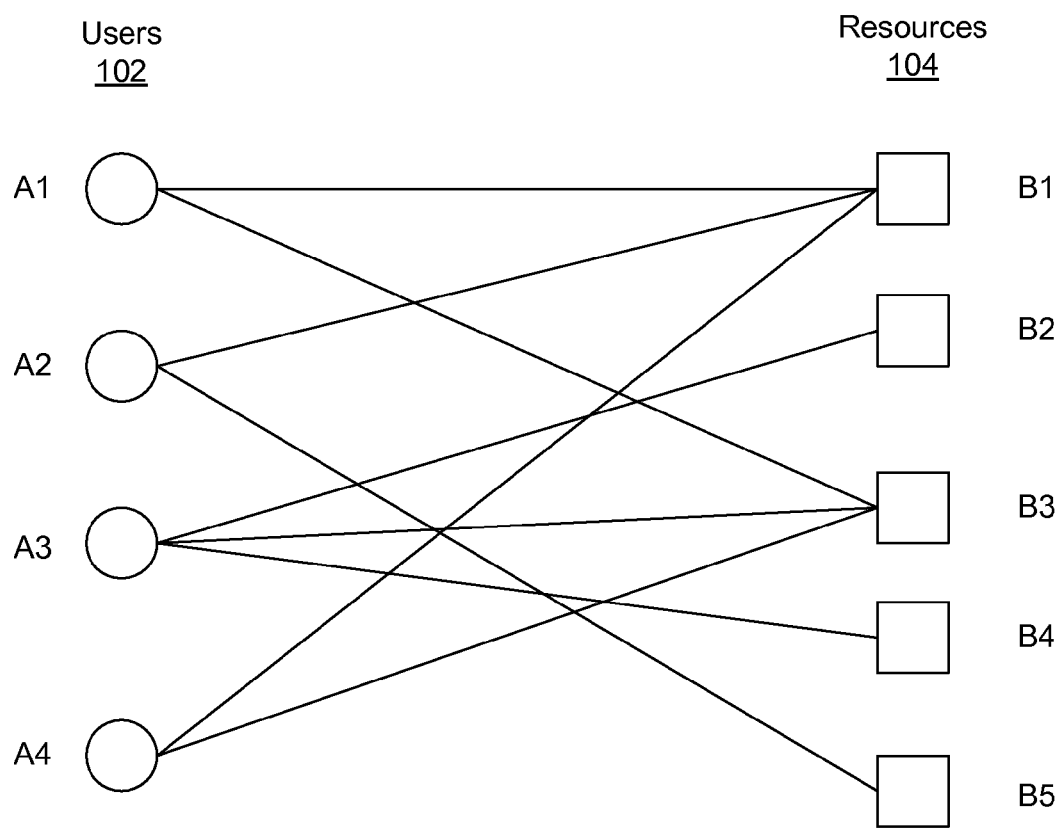
FIGS. 1A-1F are schematic diagrams depicting a simple example which is used for purposes of discussing embodiments of the present invention. More particularly.

Referring to FIG. 1A, a schematic diagram is presented showing a bipartite relationship between vertices of a first type and vertices of a second type. In this example, the vertices of the first type are user accounts (users) 102, labeled A1, A2, A3, and A4, and the vertices of the second type are resources 104, labeled B1, B2, B3, B4 and B5. Of course, in an actual network system employing an ACL set, the number of users and the number of resources may be much higher. Here, small numbers of users and resources are shown for purposes of simplified explanation.

Users may have permission to access one or more resources. In the diagram, these permissions are indicated by lines connecting users to resources. For example, user A1 has permission to access resources B1 and B3, user A2 has permission to access resources B1 and B5, and so on.

Figure 2A:
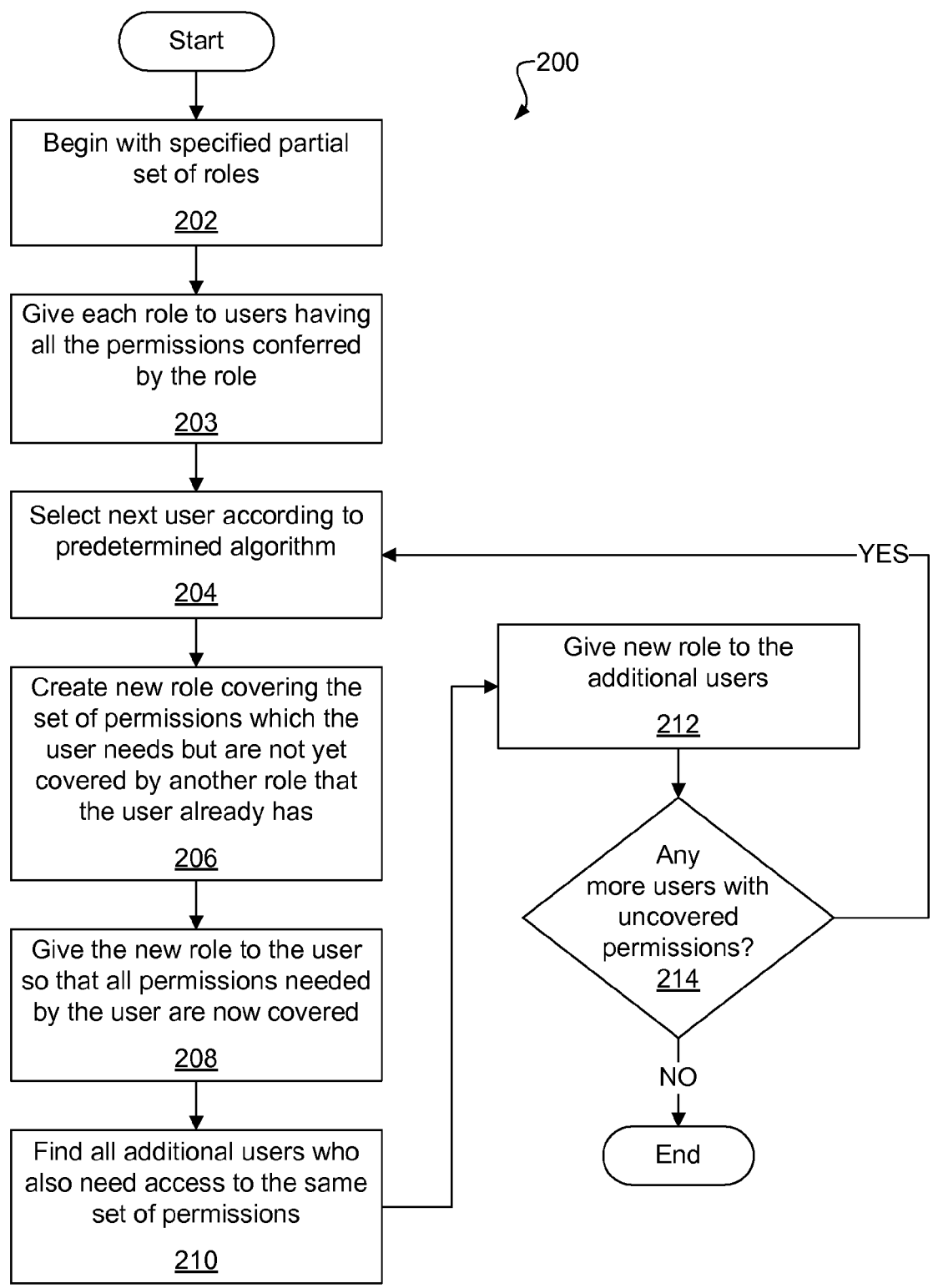
FIG. 2A is a flow chart of a computer-implemented procedure for role discovery in access control systems where a predetermined algorithm is used to select a next user in accordance with an embodiment of the invention.

Referring to FIG. 2A, a flow chart is shown of a computer-implemented procedure 200 for role discovery in access control systems where a predetermined algorithm is used to select a next user in accordance with an embodiment of the invention. Each role specifies a set of users and a corresponding set of permissions granted to each of the users in the set. Therefore, graphically, each role may be represented as a biclique covering of a set of vertices of a first type that are indicative of users and a set of vertices of a second type that are indicative of permissions to those users.

Optional first two steps are shown in which a specified partial set of roles may be given at the beginning of the procedure (block 202) and each role is given to users having all permissions conferred by the role (block 203). For example, the partial set of roles may be specified by a system administrator. If any user's set of permissions is a superset of the permissions for any one role, that user may be assigned to that role, and the corresponding edges from the bipartite graph may be removed. Role discovery is then done on the remaining edges in the graph. In other words, if a partial set of roles is provided, then the subsequent steps may be utilized to extend the set of roles so as to cover the remaining uncovered permissions. Alternatively, these steps 202 and 203 may be skipped in cases where no such partial set of roles is specified.

In block 204, a next user is selected according to a predetermined algorithm. Various predetermined algorithms may be applied to select the next user.

Figure 2B:
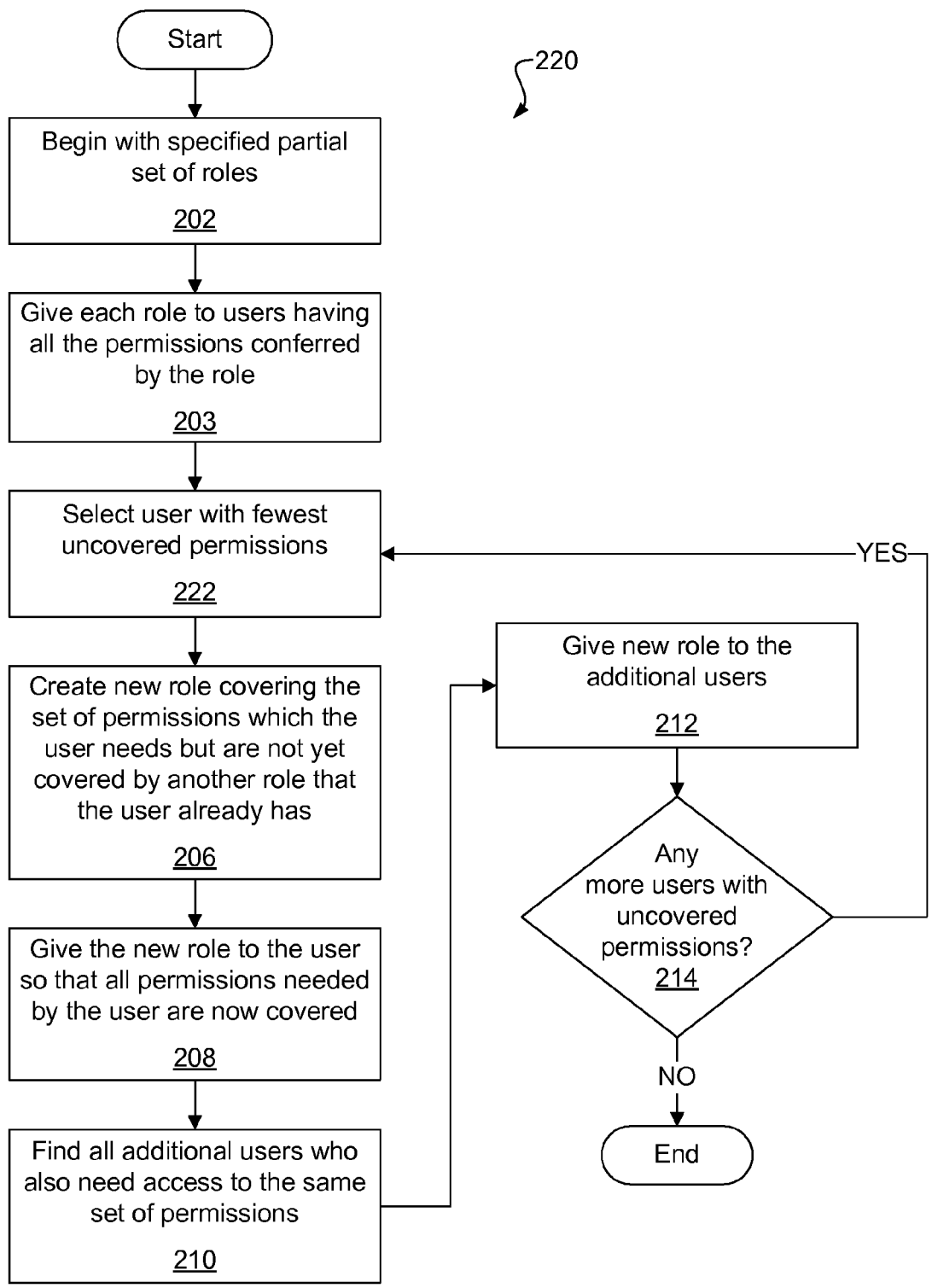
FIG. 2B is a flow chart of a computer-implemented procedure for role discovery in access control systems where a user with fewest uncovered permissions is selected as the next user in accordance with an embodiment of the invention.

In a first embodiment, the predetermined algorithm may be to select the user with fewest uncovered permissions remaining (not counting those users whose permissions are already all covered by roles). This embodiment is shown with specificity in the procedure 220 of FIG. 2B, where block 222 specifying selection of a user with the fewest uncovered permissions is substituted for block 204. In the example shown in FIG. 1A, users A1, A2 and A4 each have two permissions, while user A3 has three permissions. Assuming all these permissions are uncovered, then this specific algorithm may select user A1 (or user A2 or A4) as its two uncovered permissions is among the fewest.

Figure 2C:
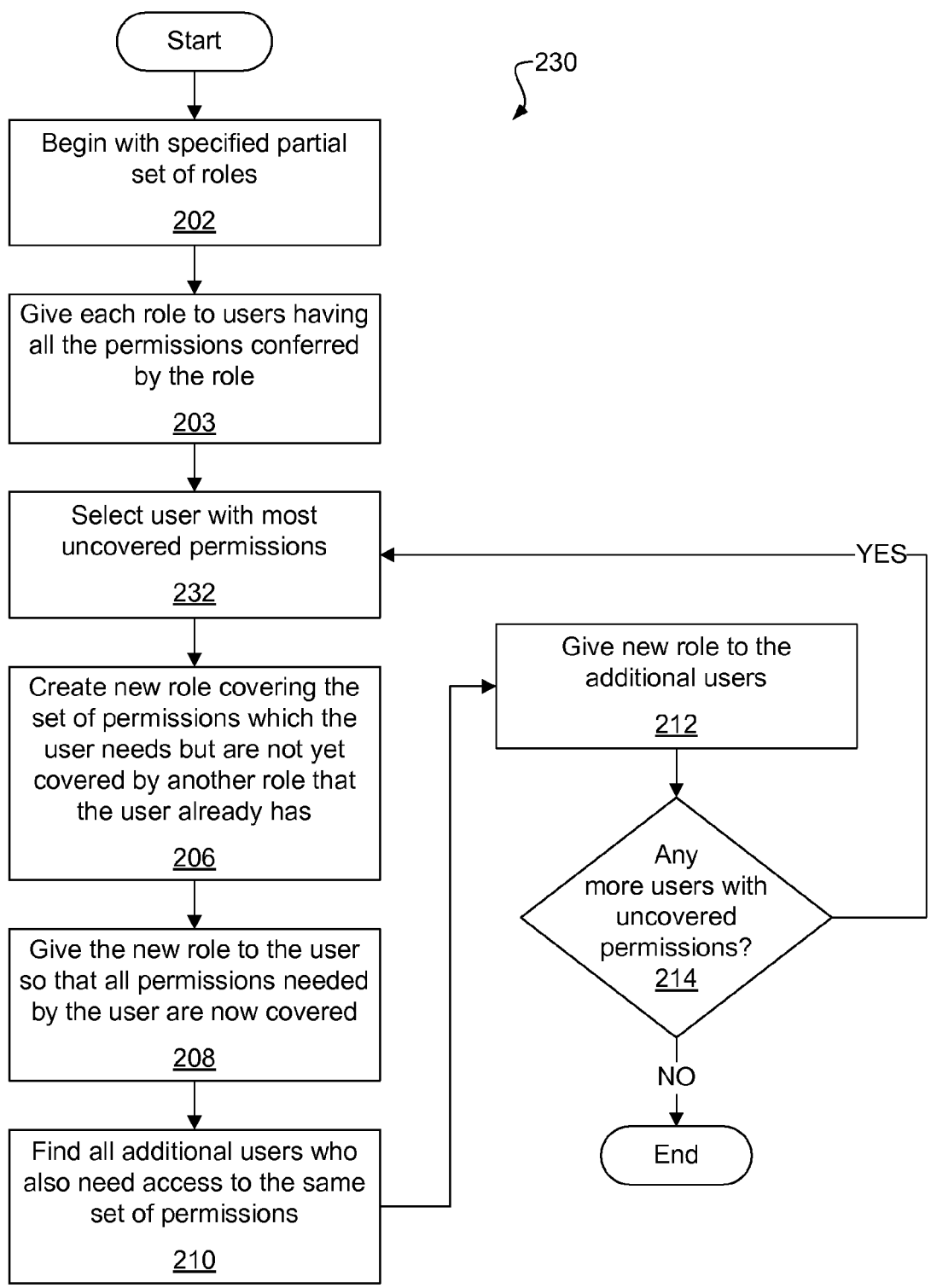
FIG. 2C is a flow chart of a computer-implemented procedure for role discovery in access control systems where a user with the most uncovered permissions is selected as the next user in accordance with an embodiment of the invention.

In a second embodiment, the predetermined algorithm may be to select the user with the most uncovered permissions remaining (not counting those users whose permissions are already all covered by roles). This embodiment is shown with specificity in the procedure 230 of FIG. 2C, where block 232 specifying selection of a user with the most uncovered permissions is substituted for block 204. In the example shown in FIG. 1A, users A1, A2 and A4 each have two permissions, while user A3 has three permissions. Assuming all these permissions are uncovered, then this specific algorithm may select user A3 as its three uncovered permissions is the most.

Figure 2D:
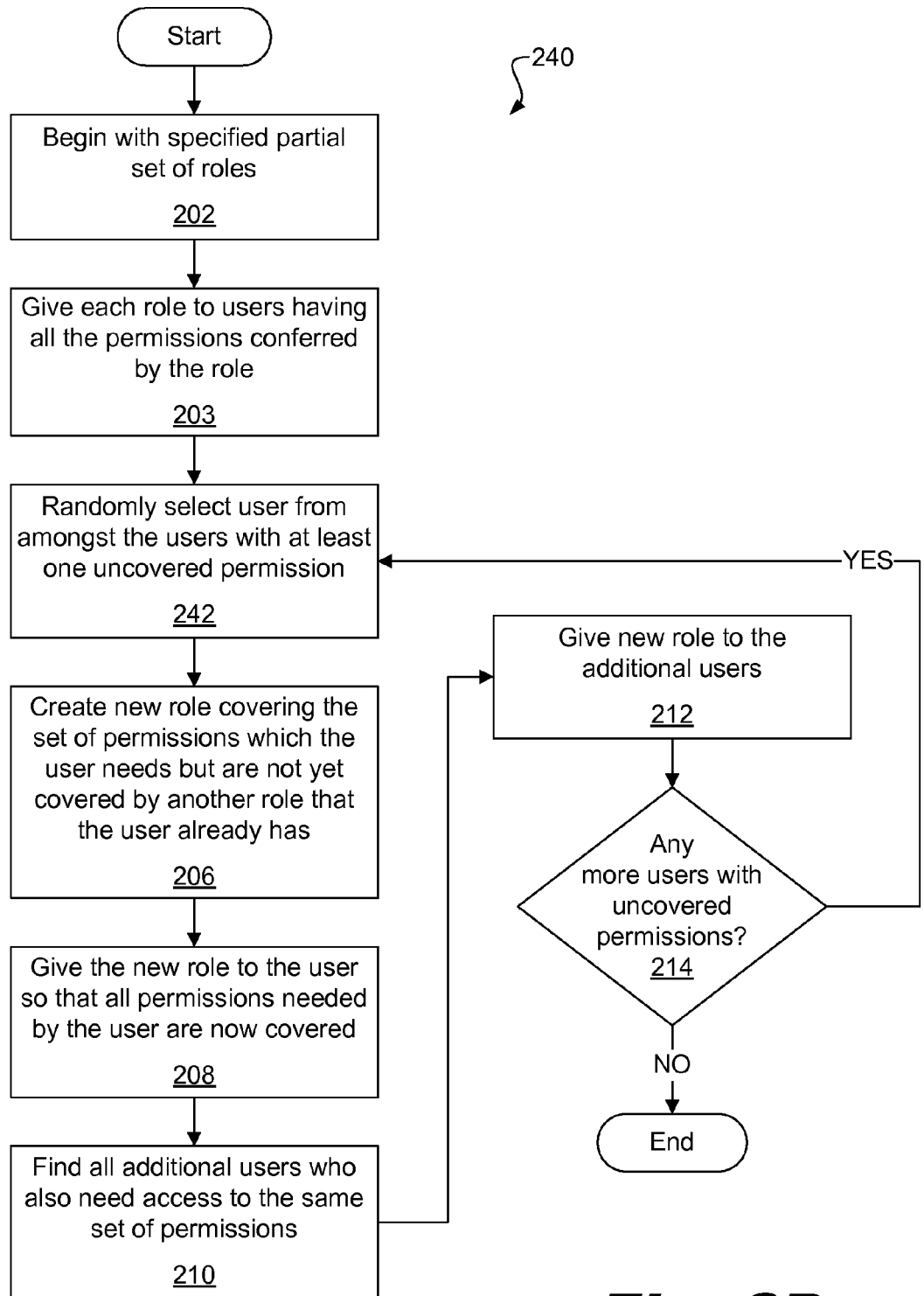
FIG. 2D is a flow chart of a computer-implemented procedure for role discovery in access control systems where a user is randomly selected from amongst the remaining users with one or more uncovered permissions in accordance with an embodiment of the invention.

In a third embodiment, the predetermined algorithm may randomly select a next user from the remaining users with at least one uncovered permission (not counting those users whose permissions are already all covered by roles). This embodiment is shown with specificity in the procedure 240 of FIG. 2D, where block 242 specifying random selection is substituted for block 204. In the example shown in FIG. 1A, assuming users A1-A4 each have at least one uncovered permission, then this specific algorithm may randomly select from amongst these four users. On the other hand, if user A1 had all of its permissions already covered by a role or roles, then this specific algorithm would randomly select from amongst the group of users including users A2, A3 and A4, but not A1.

Figure 1B:
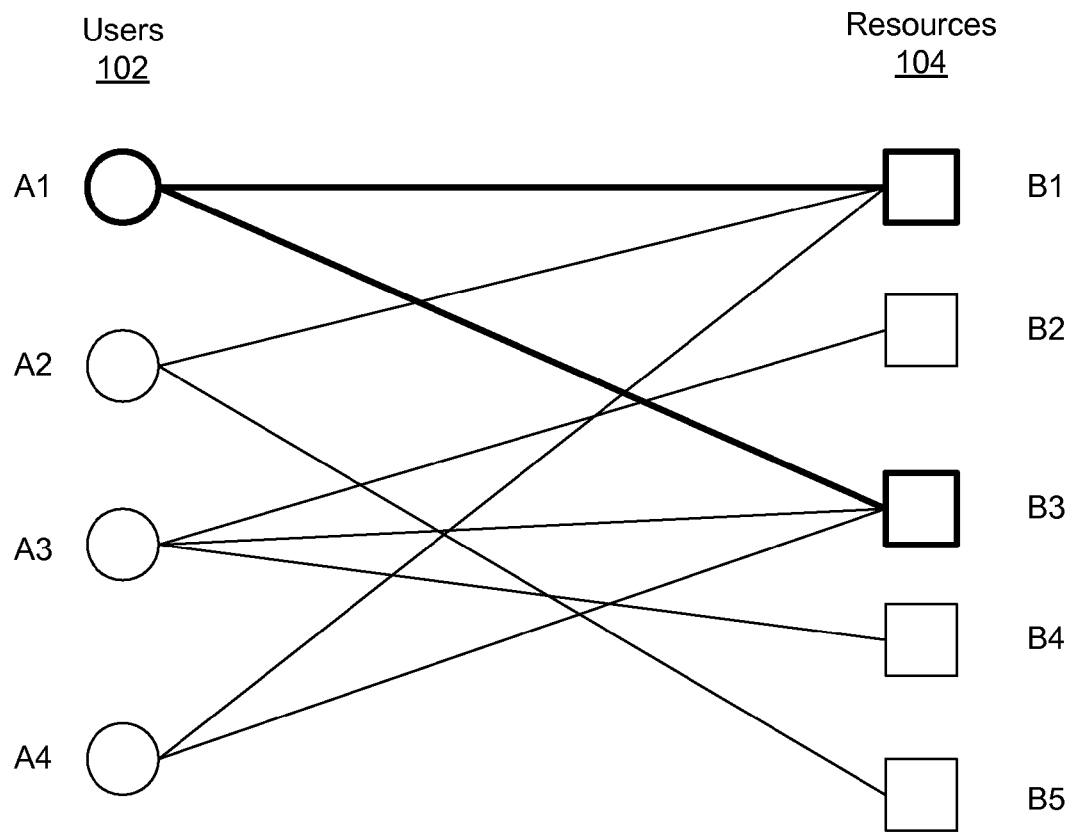
Figure 1C:
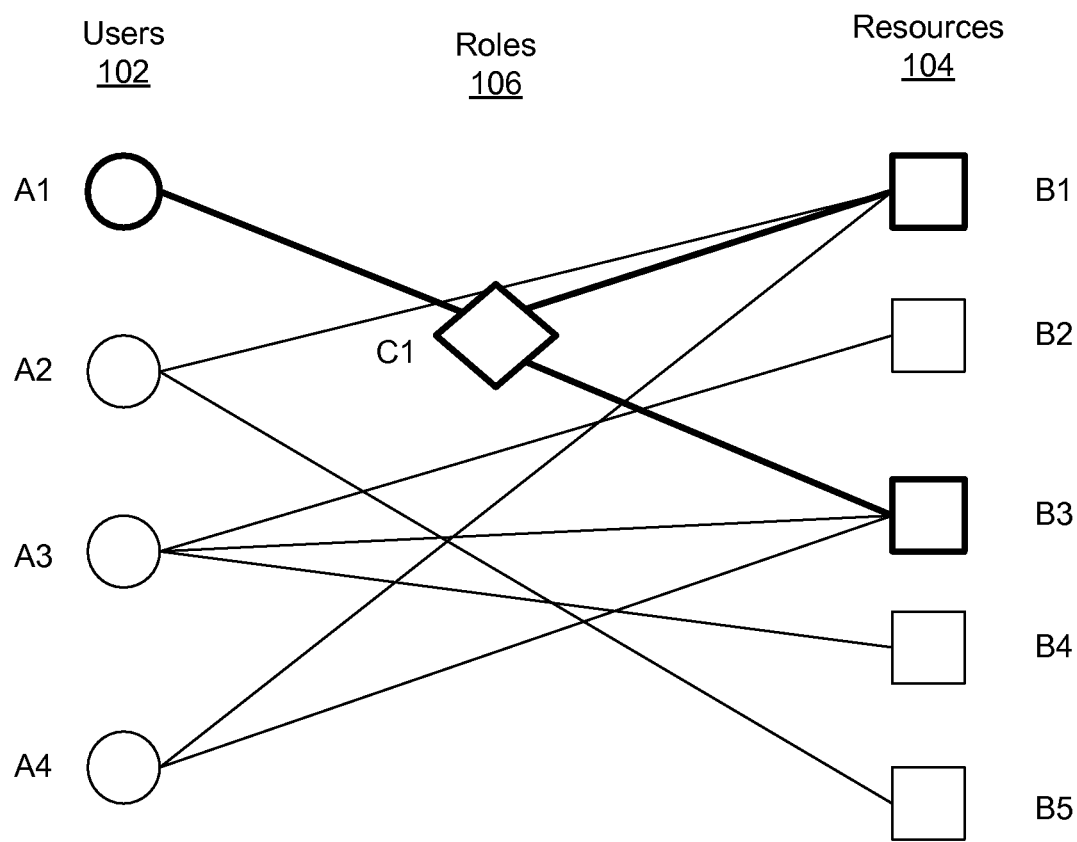

In block 206, a new role is created where the new role covers the set of permissions which the selected user still needs in that they are not yet covered by any other role that the user has. For example, consider FIG. 1A, assuming the case where none of the permissions shown have been covered so far, and further that the selected user (per block 204) is user A1. As emphasized in FIG. 1B, user A1 has permission to access resources B1 and B3. Hence, in this example, a new role would be created to cover permissions to access resources B1 and B3. Such a new role, labeled C1 is shown in FIG. 1C. As seen, role C1 provides permission to access resources B1 and B3.

Per block 208, the new role is given to the selected user. Since the new role covers all the previously uncovered permissions of the selected user, the selected user now has all its permissions covered by roles. For example, FIG. 1C shows by the line between user A1 and role C1 that user A1 is given role C1. Further, it is shown that all the permissions of user A1 are now covered by roles (in this case, by role C1).

Figure 1D:
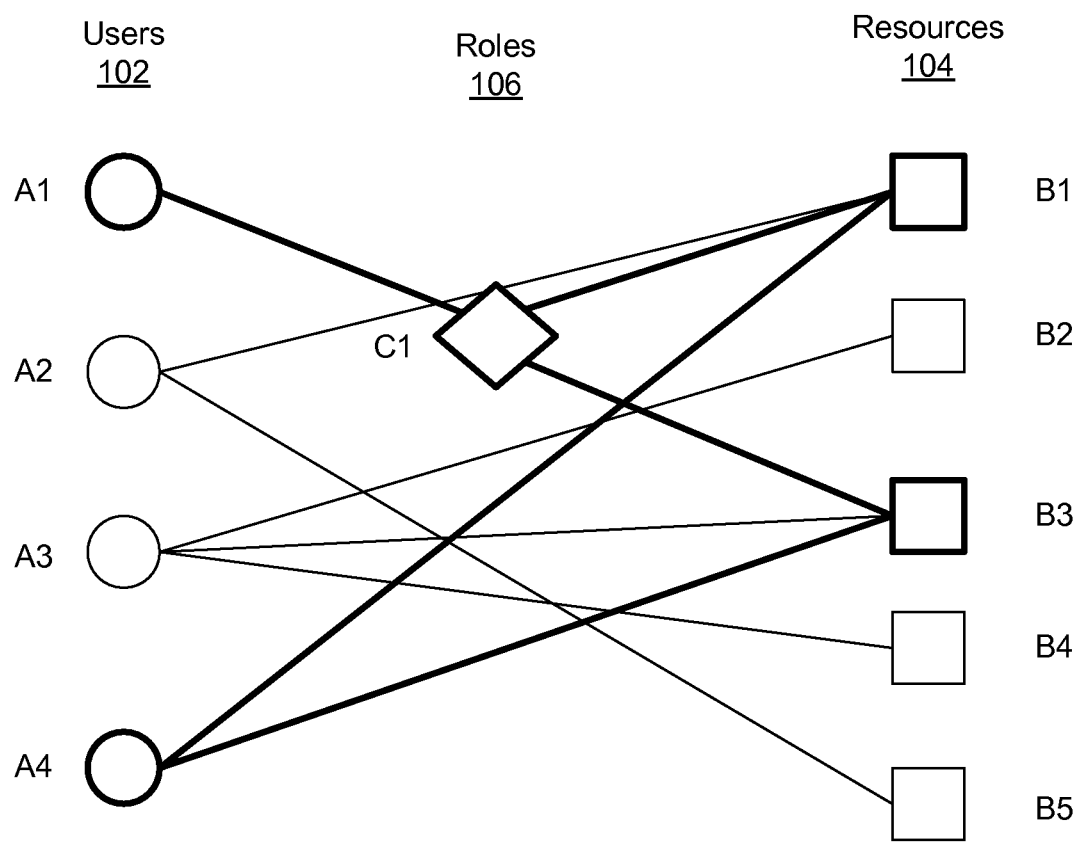

In block 210, all additional users who also need access to the same set of permissions are found. In other words, all users who also have the same uncovered permissions are found. In our example, as emphasized in FIG. 1D, user A4 also has uncovered permissions to resources B1 and B3. Hence, user A4 is an additional user who also needs access to the same set of permissions.

Figure 1E:
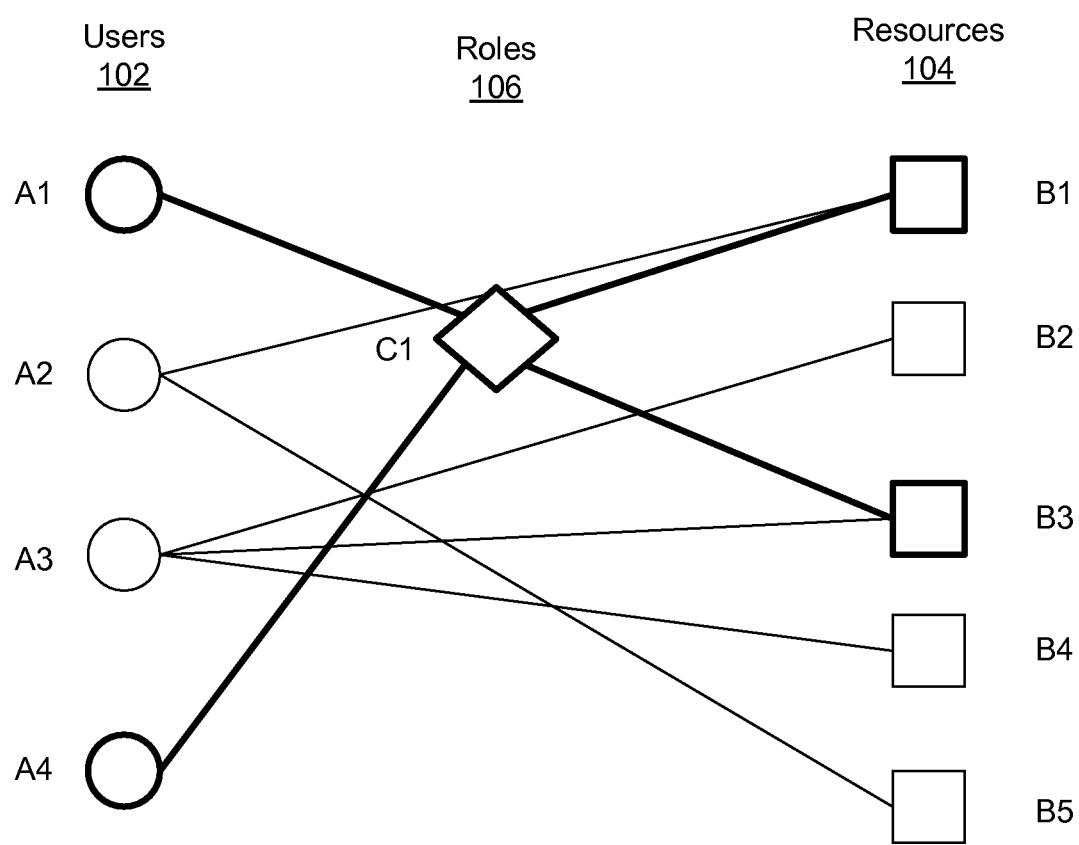

Per block 212, the new role is also given to the additional users (found per block 210). For example, FIG. 1E shows by the line between user A4 and role C1 that user A4 is also given role C1.

Per block 214, a determination may then be made as to whether there are any more users with uncovered permissions.

Figure 1F:
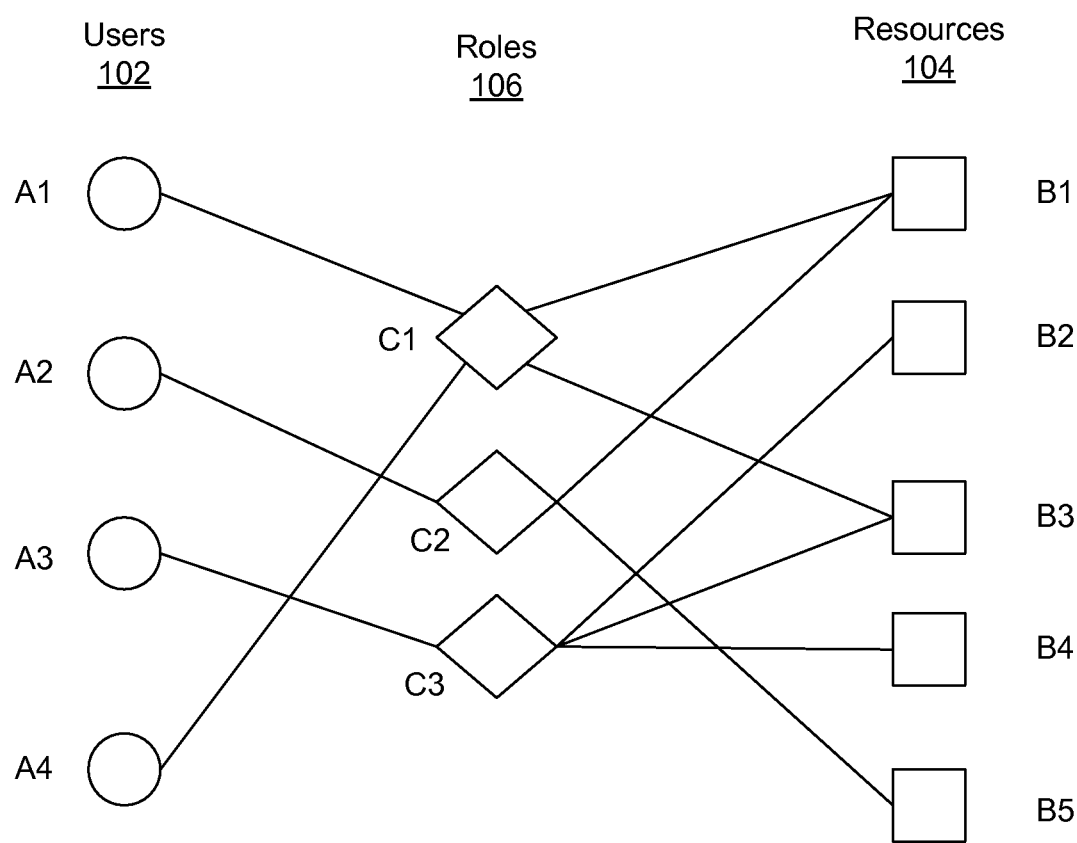

If there are one or more users with uncovered permissions remaining, then the procedure loops back to block 204 and selects the next user according to the predetermined algorithm. For example, FIG. 1F shows diagrammatically the addition of the new role C2 to cover the permissions of the user A2, and the addition of the new role C3 to cover the permissions of the user A3.

On the other hand, if there are no more users with uncovered permissions remaining, then the procedure may end as all the bipartite permissions have been covered by roles.

Figure 3A:
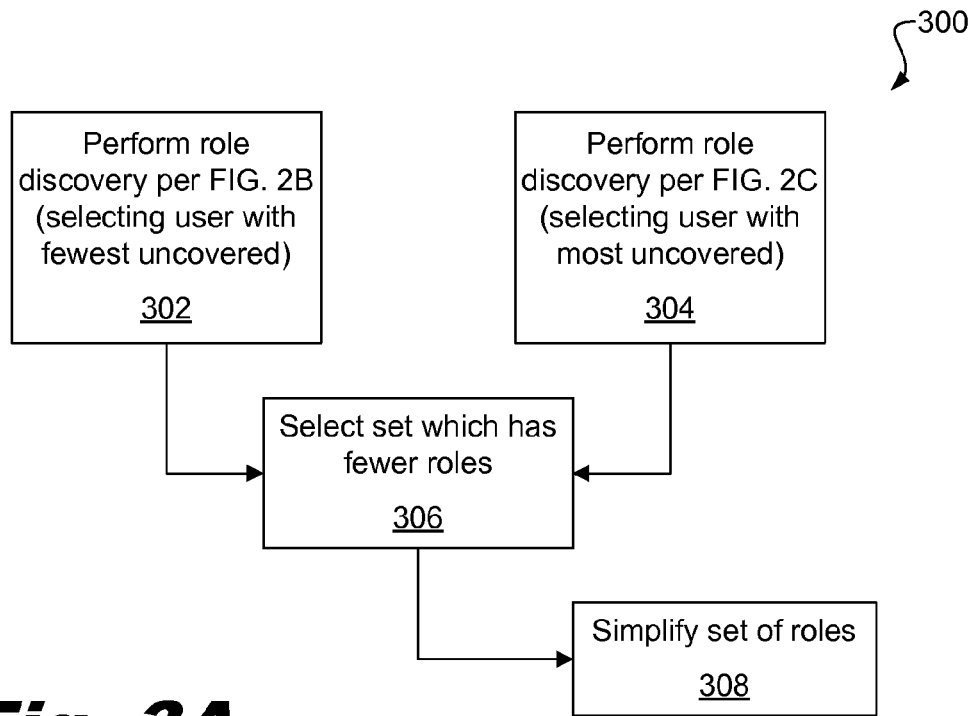
FIG. 3A is a flow chart of a computer-implemented procedure for role discovery in access control systems where multiple procedures are used independently for role discovery and a better set of roles is selected in accordance with an embodiment of the invention.

FIG. 3A is a flow chart of a computer-implemented procedure 300 for role discovery in access control systems where multiple procedures are used independently for role discovery and a better set of roles is selected in accordance with an embodiment of the invention.

Per blocks 302 and 304, role discovery may be performed by two (or more) different automated techniques. In the particular example shown, role discovery may be performed 302 per FIG. 2B, where the computer-implemented procedure 220 includes selecting 222 a next user to be a user which has the fewest uncovered permissions remaining. Role discovery may also be performed 304 per FIG. 2C, where the procedure 230 includes selecting 232 a next user to be a user which has the most uncovered permissions remaining. Thereafter, the set of roles which has the fewer roles may be selected per block 306. Alternatively, other criteria may be used to determine the preferable set of roles to select.

In addition, per block 308, the automatically discovered set of roles may be simplified. One or more computer-implemented procedures may be used to reduce complexity of the set of roles. One particular complexity-reducing procedure 400 removes overlap between roles and is discussed further below in relation to FIG. 4. Another particular complexity-reducing procedure 500 proposes roles that are over-approximations and is discussed further below in relation to FIG. 5.

Figure 3B:
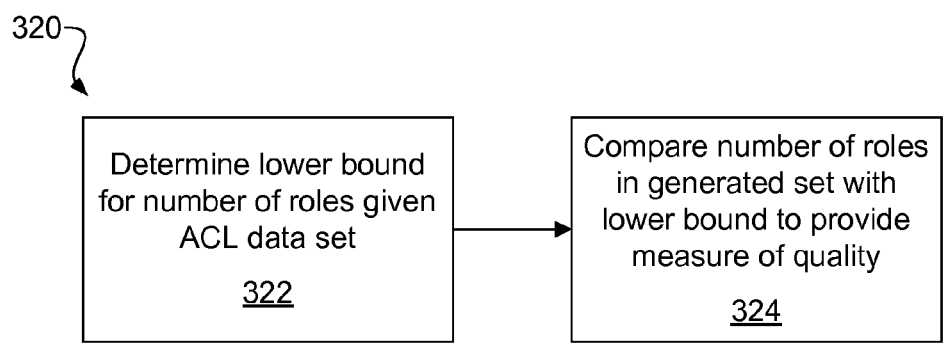
FIG. 3B is a flow chart of a computer-implemented procedure for providing a quantitative measure of quality for a generated set of roles in accordance with an embodiment of the invention.

FIG. 3B is a flow chart of a computer-implemented procedure 320 for providing a quality measure for a generated set of roles in accordance with an embodiment of the invention. This procedure 320 may be applied, for example, to the set of roles determined by the procedure 300 of FIG. 3A.

As shown per block 322, a determination may be made as to a lower bound L for the number of roles given an ACL data set. The determination may be made by finding a set consisting of L individual permissions (a single user and single resource that the user has permission to access) with the property that for any two of these individual permissions, they cannot both be conferred by any one role. In other words, the set found contains only mutually independent permissions. A pair of permissions is mutually independent if they relate to two distinct users and to two distinct resources, and either or both of these two users does not have permission to use both of these two resources.

Thereafter, per block 324, the number of roles in the discovered (or otherwise generated) set of roles may be compared to the lower bound. The gap between the number of roles in the set and the lower bound provides a quantitative measure of the quality of the set of roles, such that a smaller gap provides a higher level of confidence in the generated set of roles.

Figure 4:
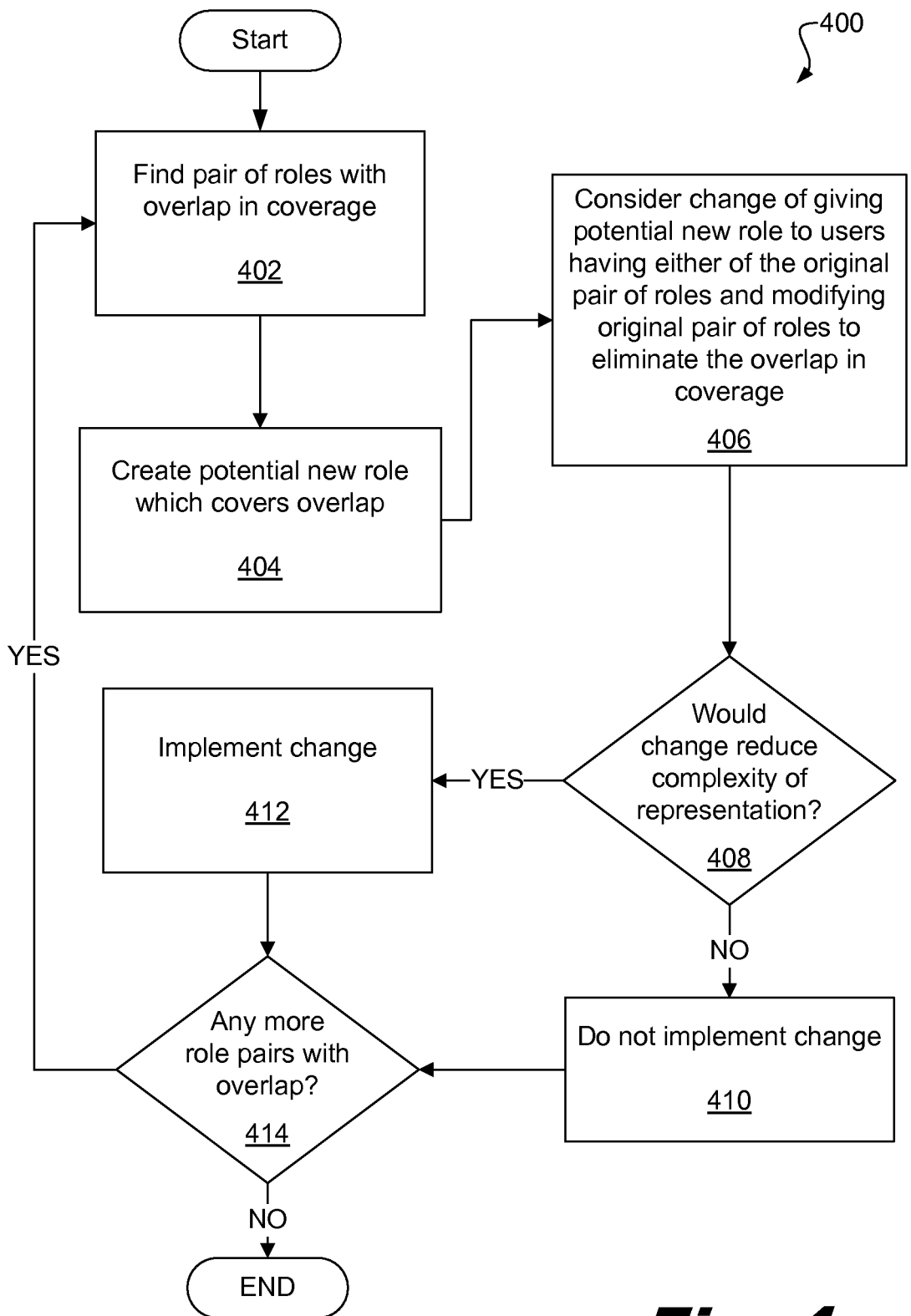
FIG. 4 is a flow chart of a computer-implemented procedure for reducing complexity in a set of roles by eliminating overlap between pairs of roles in accordance with an embodiment of the invention.

FIG. 4 is a flow chart of a computer-implemented procedure 400 for reducing complexity in a set of roles by removing overlap between pairs of roles in accordance with an embodiment of the invention. This procedure 400 may be used, for example, as part of block 308 in FIG. 3 to simplify the set of discovered roles.

In block 402, a pair of roles with overlapping coverage (i.e. overlapping permissions to access resources) is found. For example, consider the pair of roles C7 and C8, where C7 covers (i.e. gives permission to access) resources B11 through B30, and C8 covers resources B16 through B35. The original roles in this example are depicted in FIG. 7A. Here, the overlapping coverage (overlap in permissions) is to resources B16 through B30.

Per block 404, a potential new role is created which covers overlap in permissions. In our example, potential new role CX is created which covers resources B16 through B30.

In block 406, consideration is given to making a change to the role set by adding the new potential role, giving the new potential role to users having either of the original pair of roles, and modifying the original pair of roles to eliminate the overlap in coverage. In our example, the change would involve adding role CX which covers resources B16 through B30, giving role CX to users having either role C7 or C8, and modifying roles C7 and C8 to eliminate the overlapping coverage of resources B16 through B30. After the modification, role C7 would only cover resources B11 through B15, and role C8 would only cover resources B31 through B35. The modified roles in this example are shown in FIG. 7B.

Per block 408, a determination may then be made as to whether the change being considered would reduce the complexity of the RBAC representation. In one embodiment, the complexity of the RBAC representation may be calculated as the total number of "edges" between users 102 and roles 106, plus the total number of "edges" between roles 106 and resources 104, plus the total number of roles 106. In other words, this measure sums over all the roles the summand comprising the number of users who have each role and the number of resources granted by each role, and then adds the number of roles. This measure gives a number of entities that must be maintained by the system.

If the change being considered would not reduce the complexity of the representation, then, per block 410, the change is not actually implemented. On the other hand, if the change being considered reduces the complexity of the representation, then, per block 412, the change is implemented.

The procedure 400 then continues on by determining, per block 414, whether or not there are any more role pairs with overlap that have yet to be analyzed per the above-discussed steps. If there are any more role pairs with overlap to be analyzed, then the procedure may loop back to block 402 so as to analyze these pairs to see if the representation may be further simplified. Otherwise, if there are no more role pairs with overlap to be analyzed, then the procedure may end.

Applicants have found that the above-discussed procedure 400 is often effective in reducing the size of an RBAC representation by a factor of two or more. Advantageously, reducing the size of the RBAC representation reduces the number of entities that are to be maintained by the system.

Figure 5:
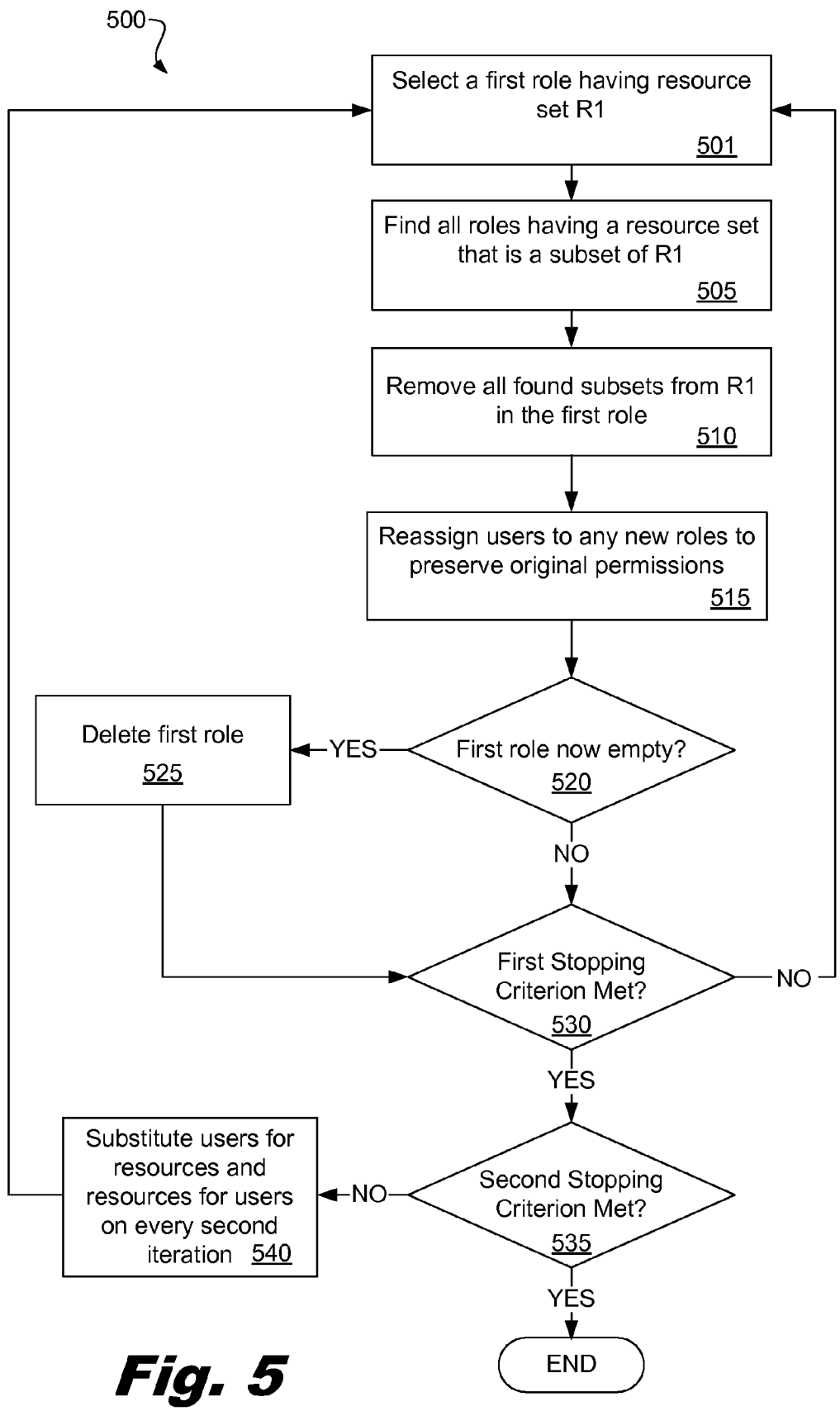
FIG. 5 is a flow chart of a computer-implemented heuristic procedure for simplifying a set of discovered roles.

FIG. 5 is a flow chart of a computer-implemented procedure 500 for heuristically simplifying a set of roles obtained by the procedures of FIGS. 2A-2D, 3A-3B, and/or 4. Specifically, the present procedure 500 may reduce complexity by reducing the number of edges between users and permissions and/or the number of total roles. The procedure 500 may be performed by, for example, a computing device used to discover the set of roles. Alternatively, the present procedure 500 may be performed by any other computing device that may suit a particular embodiment. Additionally, the present procedure 500 may be stored as computer-readable code on at least one computer-readable medium such that a computing device executing the computer-readable code would perform at least the steps of the procedure 500.

In block 501, a first role is identified from within the body of previously determined roles. The role has a corresponding resource set R1 that represents the set of resources for which any user connected to the first role has permission to access. The first role may be selected randomly, in accordance with an algorithm, or by any other means that may suit a particular application of the principles described herein.

In block 505, all other roles having a resource set that is a subset of R1 are found within the body of previously determined roles. In other words, every found role has a set of resources that are each present in R1, the resource set of the first role.

In block 510, all found subsets are removed from R1 in the first role. That is, every resource corresponding to the roles found in block 505 is removed from the resource set of the first role selected in block 501. Of course, if no subsets of R1 were found, no modification will be made to the first role.

In block 515, users are reassigned to new roles as necessary to preserve the original permissions those users had, as reflected in the bipartite graph, prior to beginning the heuristic procedure 500.

Per block 520, a determination may then be made as to whether the first role is now empty. Such will be the case in situations where the entire set of R1 is represented by one or more subsets of the resource sets found per block 505. If the first role is found to be empty, the first role is deleted per block 525, and the number of total roles in the system is consequently reduced by one.

In block 530, a determination may be made as to whether a first stopping criterion has been met. For example, in certain embodiments the first stopping criterion may include a determination that no additional role exists wherein the set of resources associated with that role are a subset of another role in the system. In other embodiments, the stopping criteria may include a threshold of elapsed time any other stopping criteria that may suit a particular application of the principles herein. If the first stopping criteria have not been met, flow is returned to block 505, where blocks 501, 505, 510, 515, 520, 525 and 530 are repeated until the first stopping criterion has been met.

If the first stopping criterion has been met per block 530, a determination may then be made per block 535 as to whether a second stopping criterion has been met. If not, blocks 505 to 535 are repeated with the sets of user vertices substituted for the sets of resources vertices and vice versa on every other iteration per block 540. Thus, in the new iteration, per block 501 a first role will be selected having user set U1, all roles having a user set that is a subset of U1 will be found per block 505, and all found subsets will be removed from U1 in the first role per block 510. Consequently, blocks 501 to 535 will be continuously repeated, with the sets of user vertices substituted for the sets of permissions vertices on every second iteration of the second stopping criterion being met per block 530. This will continue until a determination has been made per block 535 that a second stopping criterion has been met. In certain embodiments, the second stopping criterion may include a set number of iterations of the first stopping criterion being met per block 530. In other embodiments, the second stopping criterion may include a threshold amount of elapsed time, a desired level of convergence of the number of roles and/or edges in the system, and/or any other criteria that may be suitable according to a particular embodiment of the principles described herein.

Figure 6A:
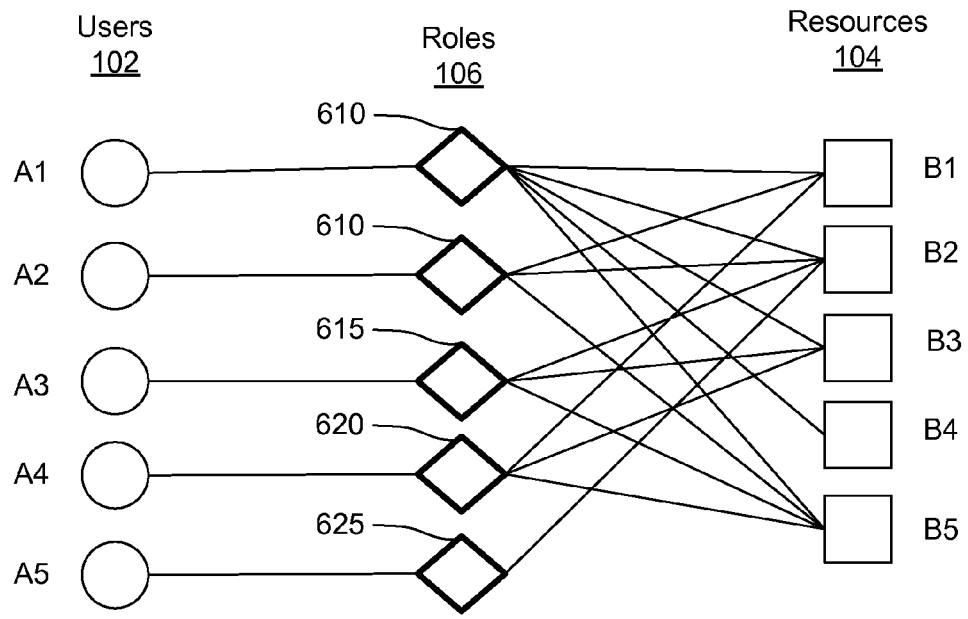
FIGS. 6A to 6H are schematic diagrams showing an illustrative implementation of the heuristic procedure of FIG. 5 on an exemplary role set, according to one exemplary embodiment of the principles described herein.

FIGS. 6A through 6H illustrate one example of role reduction and simplification according to the process 500 of FIG. 5. FIG. 6A shows a set of users 102, a set of resources 104, and a set of previously discovered roles 106 that connect the users 102 to individual resources 104 according to permissions in an access control system. Again, the principles described herein are not limited to role discovery and simplification in an access control system. Rather, it is anticipated that the principles described herein may be applied to any situation in which a minimum biclique cover of a bipartite graph is sought.

Figure 6B:
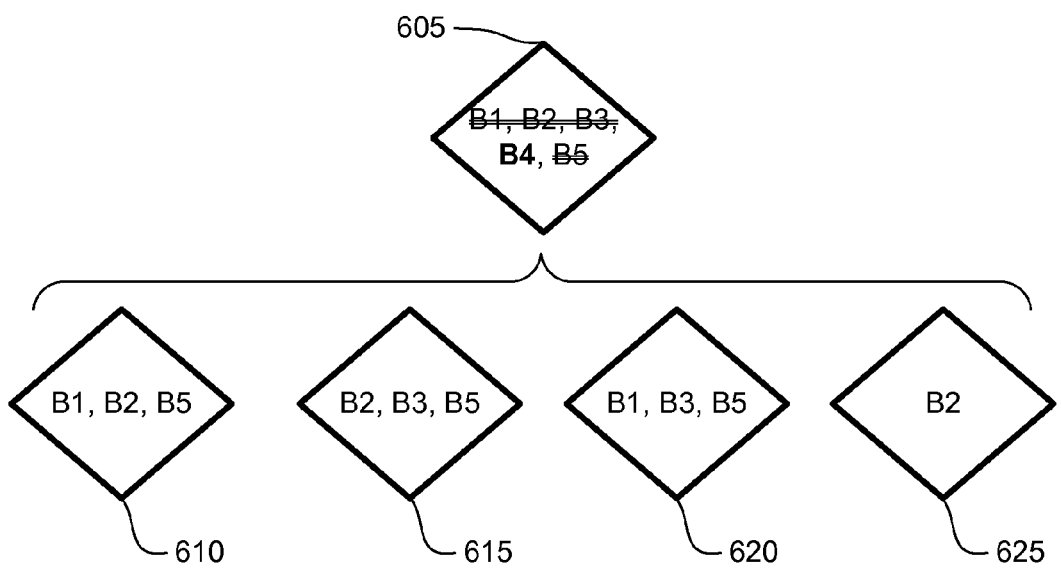

In FIG. 6B, each of the roles 605, 610, 615, 620, 625 of FIG. 6A is shown with its corresponding set of resources. For example, role 605 has a resource set that includes resources B1, B2, B3, B4, and B5. In the present example, role 605 is selected per block 501 in FIG. 5, and each of the remaining roles 610, 615, 620, 625 is found per block 505, due to the fact that each of the remaining roles 610, 615, 620, 625 has a resource set that is a subset of the resource set of role 601. Per block 510, each of the resources in role 605 that is represented by one of the remaining roles 610, 615, 620, 625 is removed from the resource set of role 605, leaving role 605 with a permission set that only includes the single resource B4.

Figure 6C:
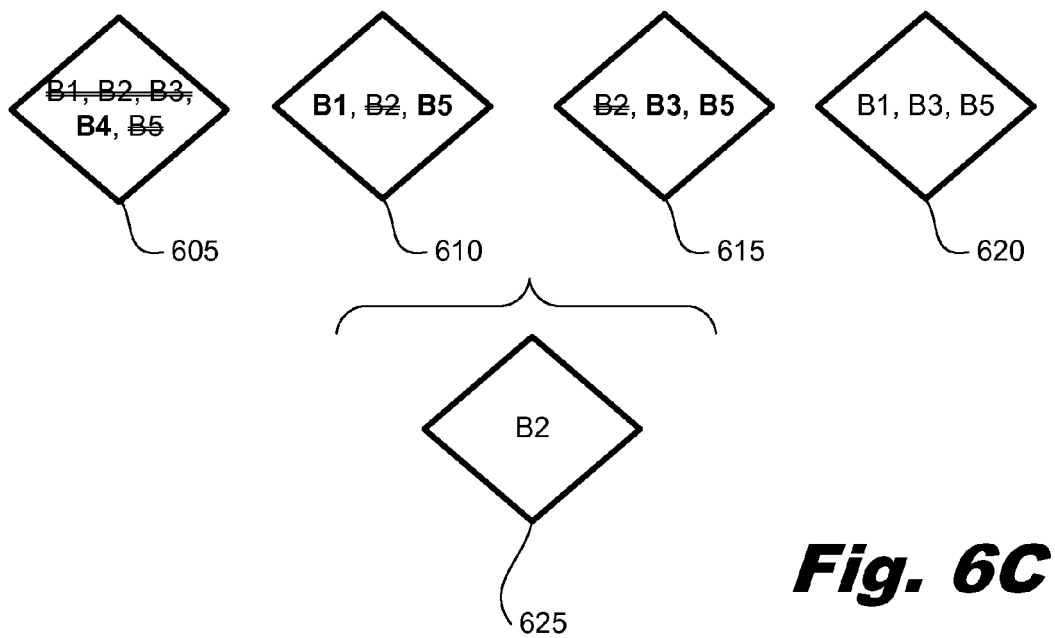

In the present example, the first stopping criteria is a determination that no roles remain that have a resource set that is a subset of another role. As this is not the case, the first stopping criterion has not been met per block 530, and flow is returned to block 505. As shown in FIG. 6C, the resource set of role 625—single resource B2—is a subset of the resource set of both role 610 and role 615. Therefore, through consecutive iterations of blocks 501 to 530, resource B2 will be removed from both of roles 610, 615.

Figure 6D:
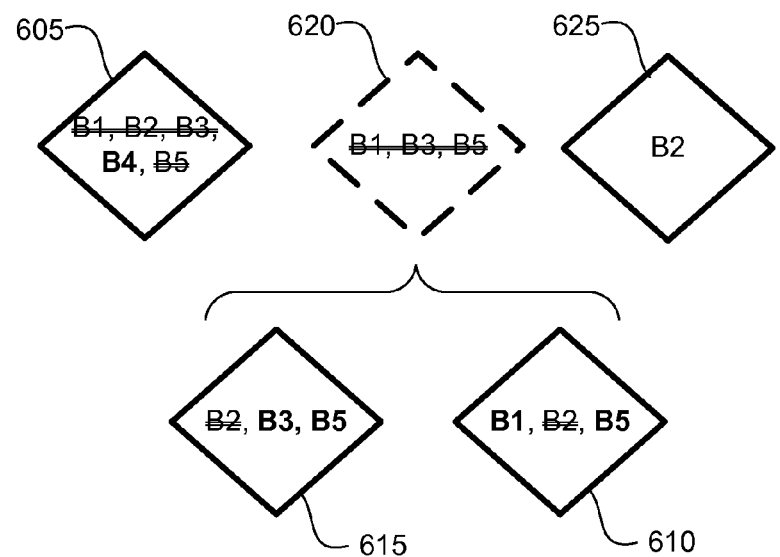

As shown in FIG. 6D, newly modified roles 610, 615 are both subsets of role 620. Therefore, successive iterations of blocks 501 to 530 will remove the resource sets of roles 610, 615 from that of role 620, leaving role 620 empty. Role 620 will be subsequently deleted, thereby reducing the number of roles in the system by one.

Figure 6E:
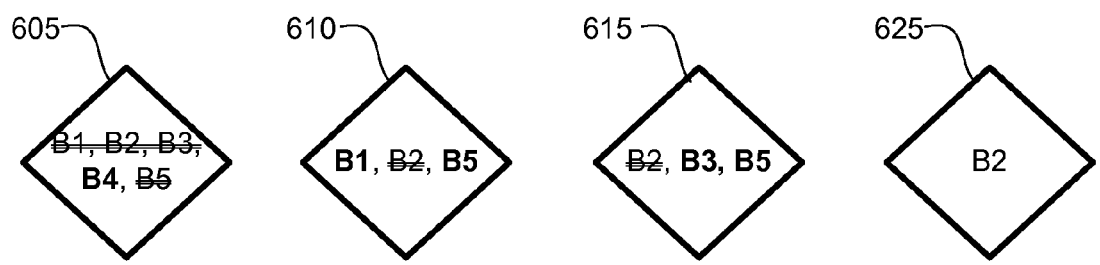

FIG. 6E shows the remaining four roles 605, 610, 615, 625 as they have been modified once the first stopping criterion has been met per block 530.

Figure 6F:
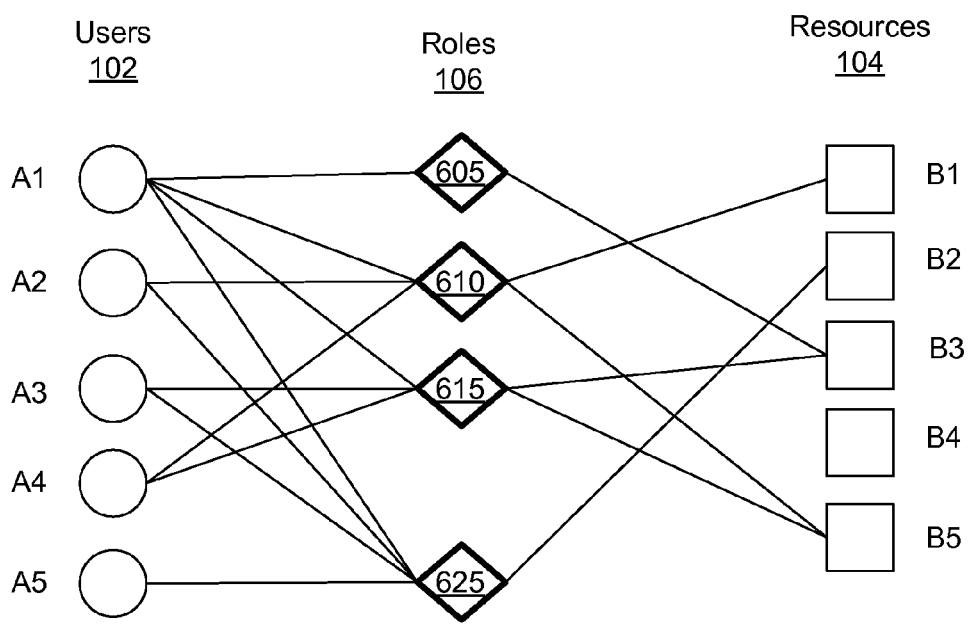

FIG. 6F shows the assignation of users 102 to the newly modified roles 605, 610, 615, 625 to preserve the original user-resource permissions per block 515.

Figure 6G:
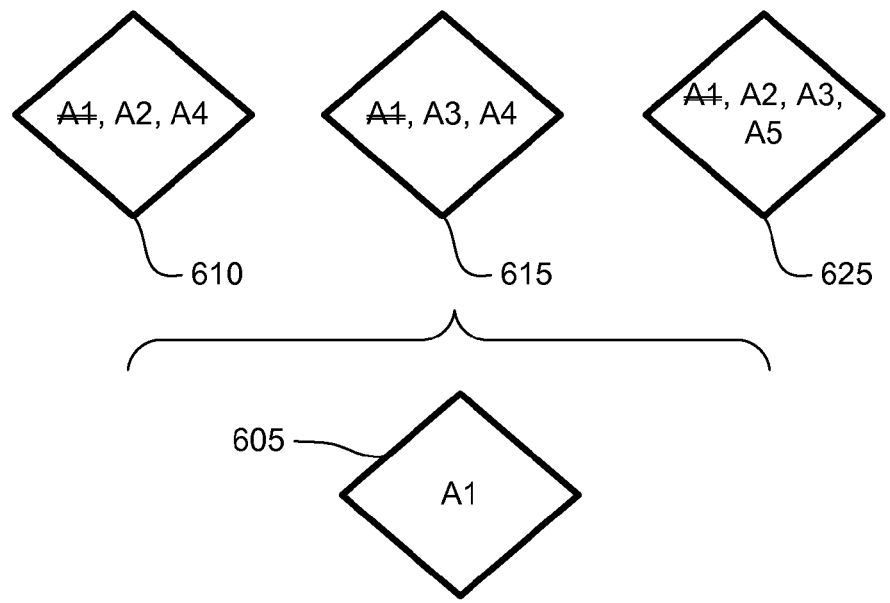
Figure 6H:
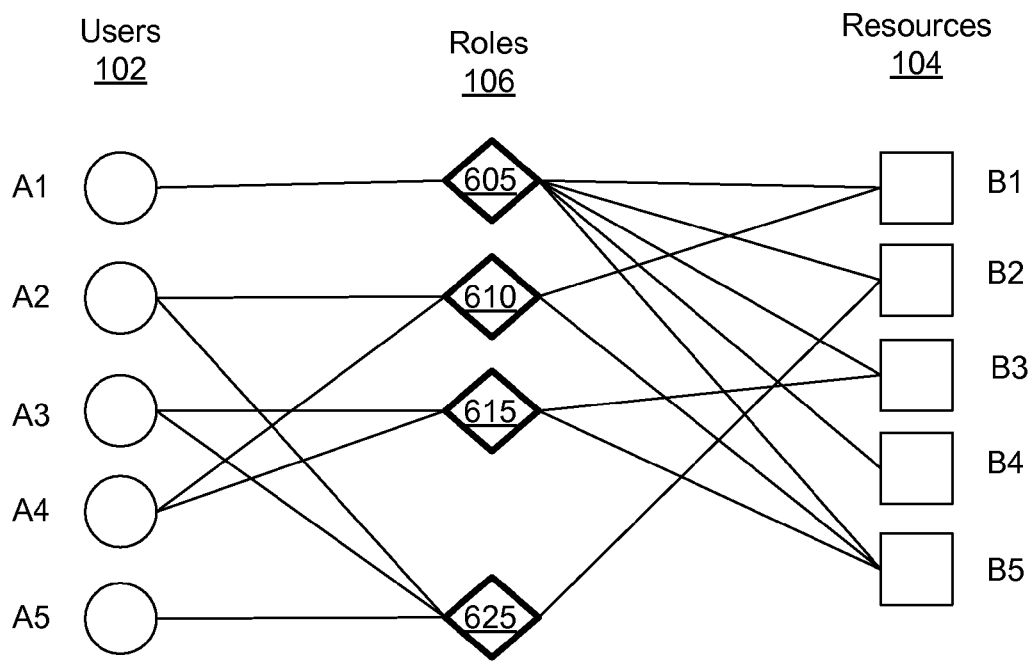

If the second stopping criterion has not been met per block 535, blocks 505 to 535 will be repeated with user sets substituted for resource sets and vice versa. FIGS. 6G and 6H show how this may proceed.

In FIG. 6G, each of the roles 605, 610, 625 shown in FIGS. 6E and 6F is shown with its corresponding set of users. For example, role 605 contains a user set of single user A1. Because role 605 contains a user set that is a subset of each of the remaining roles 610, 615, 625, single user A1 will be removed from the user sets of these remaining roles 610, 615, 625 through three successive iterations of blocks 501 to 530, after which the first stopping criterion will have been met per block 530.

FIG. 6H shows the assignation of resources 104 to the newly modified roles 605, 610, 615, 625 to preserve the original user-resource permissions per block 515. If the second stopping criterion has been met per block 535, the process 500 of FIG. 5 will end here. Otherwise, the heuristic process 500 will repeat again as previously described.

FIG. 7 is a schematic diagram of an example computer system or apparatus 700 which may be used to execute the computer-implemented procedures for role discovery and role reduction in accordance with an embodiment of the invention. The computer 700 may have fewer or more components than illustrated. The computer 700 may include a processor 701, such as those from the Intel Corporation or Advanced Micro Devices, for example. The computer 700 may have one or more buses 703 coupling its various components. The computer 700 may include one or more user input devices 702 (e.g., keyboard, mouse), one or more data storage devices 706 (e.g., hard drive, optical disk, USB memory), a display monitor 704 (e.g., LCD, flat panel monitor, CRT), a computer network interface 705 (e.g., network adapter, modem), and a main memory 708 (e.g., RAM).

In the example of FIG. 10, the main memory 708 includes software modules 710, which may be software components to perform the above-discussed computer-implemented procedures. The software modules 710 may be loaded from one or more data storage devices 706 to the main memory 708 for execution by the processor 701. Specifically, the software modules 710 may include one or more modules of computer readable code for performing the tasks of role discovery and simplification according to the principles described herein. The computer network interface 705 may be coupled to a computer network 709, which in this example includes the Internet.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of migrating an electronic access control system for a number of available electronic resources from an Access Control List to a Role-Based Access Control (RBAC) system, the method comprising, with a processor:
    discovering a plurality of roles, wherein each of said roles is a biclique covering of a set of vertices of a first type and a corresponding set of vertices of a second type;
    selecting a first role in said plurality and finding all roles in said plurality that have a set of vertices of said second type that is a subset of said set of vertices of said second type in said first role;
    removing each of said subsets from said set of vertices of said second type corresponding to said first role;
    reassigning said vertices of said first type to said roles such that original associations between said vertices of said first type and said vertices of said second type are maintained; and
    performing access control for the available electronic resources using said roles and vertices in an RBAC system.

2. The method of claim 1, further comprising:
    determining if said first role is empty after said subsets are removed from said set of vertices of said second type corresponding to said first role; and
    deleting said first role if said removal leaves said first role empty.

3. The method of claim 1, further comprising:
    repeating said selecting, finding, removing, and reassigning until a second stopping criterion is met; and
    substituting said vertices of said second type for said vertices of said first type and said vertices of said first type for said vertices of said second type every other time a first stopping criterion is met.

4. The method of claim 3, wherein said first stopping criterion comprises at least one of: a threshold of elapsed time and a determination that that no additional role exists having a set of vertices of said second type that is a subset of a set of vertices of said second type in another role.

5. The method of claim 3, wherein said second stopping criterion comprises at least one of: a threshold number of iterations, a threshold amount of elapsed time, and a threshold degree of convergence of a number of said roles.

6. The method of claim 1, wherein said vertices of said first type correspond to individual users and said vertices of said second type correspond to resources for which access is granted to said users, as specified by said roles.

7. A system for implementing a Role-Based Access Control (RBAC) system for a number of electronic resources, the system comprising:
    digital memory configured to store at least a plurality of vertices of a first type, a plurality of vertices of a second type, and a plurality of biclique roles associating sets of said vertices of said first type with sets of said vertices of said second type; and
    at least one processor in communication with said memory, said processor being configured to:
        select a first role in said plurality of biclique roles and find all roles in said plurality of biclique roles that have a set of vertices of said second type that is a subset of said set of vertices of said second type in said first role;
        remove each of said subsets from said set of vertices of said second type corresponding to said first role;
        reassign said vertices of said first type to said roles such that original associations between said vertices of said first type and said vertices of said second type are maintained; and
        perform access control for the available electronic resources using said roles and vertices in an RBAC system.

8. The system of claim 7, wherein said processor is further configured to:
    determine if said first role is empty after said subsets are removed from said set of vertices of said second type corresponding to said first role; and
    delete said first role if said removal leaves said first role empty.

9. The system of claim 7, wherein said processor further configured to:
    repeat said selecting, finding, removing, and reassigning until a second stopping criterion is met; and
    substitute said vertices of said second type for said vertices of said first type and said vertices of said first type for said vertices of said second type every other time a first stopping criterion is met.

10. The system of claim 8, wherein said first stopping criterion comprises at least one of: a threshold of elapsed time and a determination that that no additional role exists having a set of vertices of said second type that is a subset of a set of vertices of said second type in another role.

11. The system of claim 9, wherein said second stopping criterion comprises at least one of: a threshold number of iterations, a threshold amount of elapsed time limit, and a threshold degree of convergence of a number of said roles.

12. The system of claim 7, wherein said vertices of said first type correspond to users and said vertices of said second type correspond to resources for which access is granted to certain of said users, as specified by said roles.

13. A computer program product comprising:
    a non-transitory computer readable device having computer usable program code embodied therewith, the computer usable program code comprising:
        computer usable program code configured to discover a plurality of roles, wherein each of said roles is a biclique covering of a set of vertices of a first type and a corresponding set of vertices of a second type;

computer usable program code configured to select a first role in said plurality and find all roles in said plurality that have a set of vertices of said second type that is a subset of said set of vertices of said second type in said first role;

computer usable program code configured to remove each of said subsets from said set of vertices of said second type corresponding to said first role;

computer usable program code configured to reassign said vertices of said first type to said roles such that original associations between said vertices of said first type and said vertices of said second type are maintained; and computer usable program code configured to perform access control for the available electronic resources using said roles and vertices in an RBAC system.

14. The computer program product of claim 13, further comprising:

computer usable program code configured to determine if said first role is empty after said subset is removed from said set of vertices of said second type corresponding to said first role; and computer usable program code configured to delete said first role if said removal leaves said first role empty.

15. The computer program product of claim 13, further comprising:

computer usable program code configured to repeat said selecting, finding, removing, and reassigning steps until a first stopping criterion is met;

computer usable program code configured to substitute said vertices of said first type with said vertices of said second type in said finding, removing, and adding steps every other time said first criterion is met.

16. The computer program product of claim 13, further comprising:

computer usable program code configured to create a new role covering a set of permissions associated with a user account of said first type that are not yet covered with another role associated with said user account.

17. The computer program product of claim 16, further comprising:

computer usable program code configured to assign said new role to said user account so that all permissions needed for said user account are covered.

18. The computer program product of claim 17, further comprising:

computer usable program code configured to find other user accounts who need access to said permissions.

19. The computer program product of claim 18, further comprising:

computer usable program code configured to assign said new role to said other user accounts.

20. The computer program product of claim 16, wherein vertices of said first type are user accounts.

* * * * *